United States Patent [19]
Rudolph

[11] Patent Number: 4,815,960
[45] Date of Patent: Mar. 28, 1989

[54] BLOWING MOULD ADJUSTABLE IN LONGITUDINAL DIRECTION

[76] Inventor: Martin Rudolph, Industriestrasse 47, 5620 Velbert 1, Fed. Rep. of Germany

[21] Appl. No.: 2,762

[22] PCT Filed: Apr. 29, 1986

[86] PCT No.: PCT/EP86/00255
§ 371 Date: Dec. 29, 1986
§ 102(e) Date: Dec. 29, 1986

[87] PCT Pub. No.: WO86/06680
PCT Pub. Date: Nov. 20, 1986

[30] Foreign Application Priority Data
May 6, 1985 [DE] Fed. Rep. of Germany ....... 3516175

[51] Int. Cl.$^4$ .............................................. B29C 49/30
[52] U.S. Cl. ...................................... 425/522; 249/74; 249/82; 249/136; 249/155; 264/532
[58] Field of Search ............... 425/537, 539, 540, 541, 425/577, 522; 249/74, 75, 136, 155, 158, 82; 264/531, 532, 534

[56] References Cited

U.S. PATENT DOCUMENTS

| | | | |
|---|---|---|---|
| 765,365 | 7/1904 | Lamp'l | 249/158 |
| 817,189 | 4/1906 | Reed | 249/155 |
| 2,994,286 | 8/1961 | Mussari, Jr. | 249/155 |
| 3,340,926 | 9/1967 | Sylvester | 249/155 |
| 3,354,509 | 11/1967 | Ammondson | 425/195 |
| 3,480,994 | 12/1969 | Moslo | 425/538 |
| 3,570,057 | 3/1971 | Doyle | 425/522 |
| 3,867,084 | 2/1975 | Miller | 425/383 |

FOREIGN PATENT DOCUMENTS

| | | |
|---|---|---|
| 1570097 | 6/1969 | France . |
| 2110204 | 6/1972 | France . |
| 2171930 | 9/1973 | France . |
| 1004314 | 9/1965 | United Kingdom . |
| 1360259 | 7/1974 | United Kingdom . |

Primary Examiner—Jay H. Woo
Assistant Examiner—C. Scott Bushey
Attorney, Agent, or Firm—Lee & Smith

[57] ABSTRACT

A blowing mould has a mould with a terminal part which can be adjusted in axial direction relative to the mould by means of a threaded spindle and an adjustment nut. The terminal part is guided in a pressure sealed manner in the mould and is provided with a projecting rim which effects a seamless transition between the terminal part and the inner wall of the mould.

5 Claims, 1 Drawing Sheet

U.S. Patent  Mar. 28, 1989  4,815,960
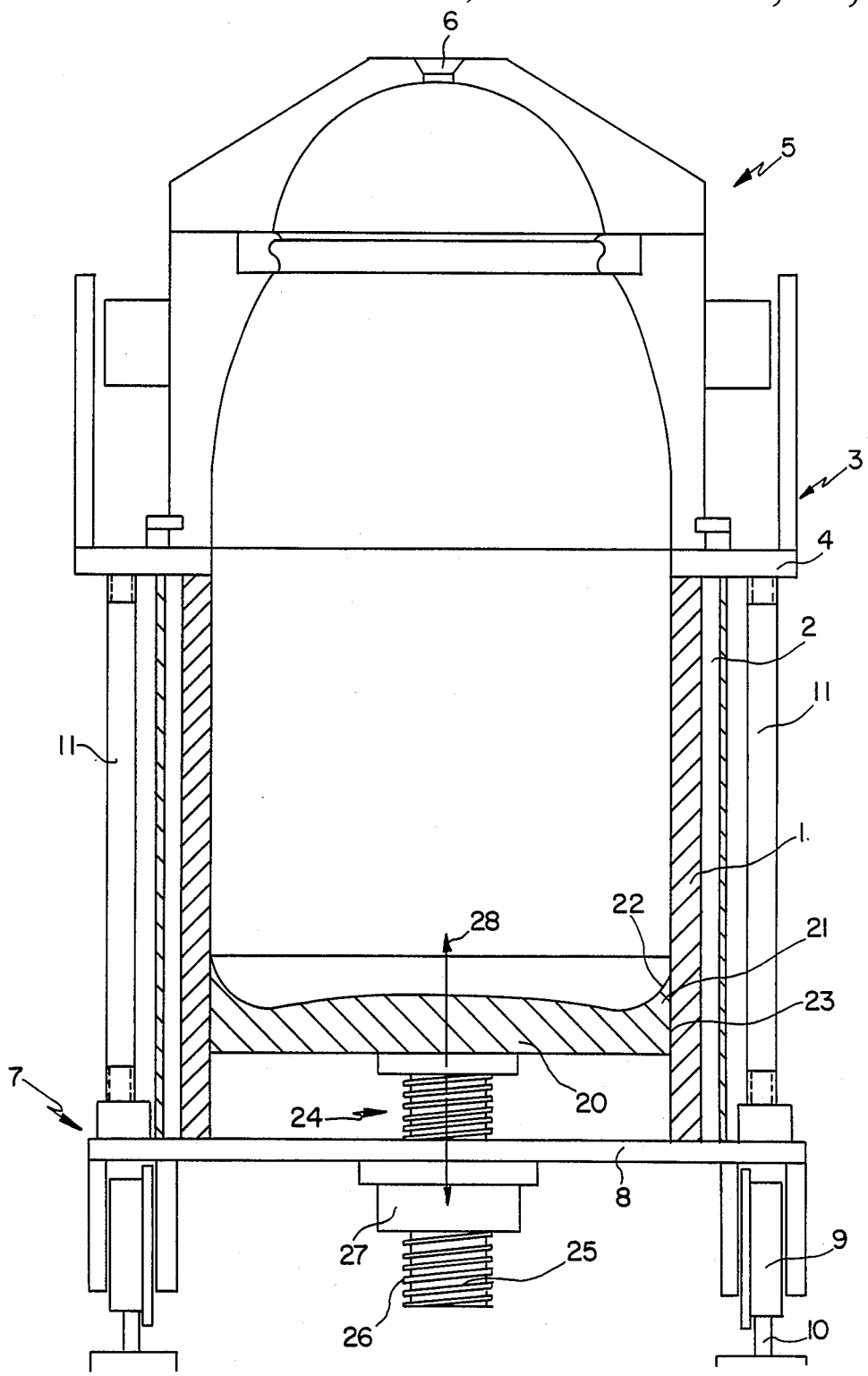

BLOWING MOULD ADJUSTABLE IN LONGITUDINAL DIRECTION

TECHNICAL FIELD

The invention relates to a blowing mould for blow moulding containers.

UNDERLYING PRIOR ART

Known blowing moulds of this kind (DE-PS 1 479 631) consist of a generally cylindric mould which is closed at one end and which is arranged to be closed at the other end by a multipart top. A substantial disadvantage of the known blowing mould is that only containers of a unitary size or length, respectively, can be made with this blowing mould.

DISCLOSURE OF THE INVENTION

It is the object of the present invention to provide a blowing mould which can be used for making containers of different dimensions, particularly of different lengths.

According to the invention this object is achieved in that the blowing mould comprises a terminal part guided in pressure sealed manner on the inside in the mould, and an adjusting device for axial adjustment of the terminal part.

Thus the blowing mould according to the invention comprises a terminal part arranged to be axially adjusted within the mould, by axial adjustment of which the mould is variable in its length by means of the adjusting device. Therefore containers of different lengths and thus containers of most different volumes can be made by means of the blowing mould according to the invention.

Advantageously the terminal part is provided with a projecting rim on the inside of the mould. This projecting rim can be of concave shape on the inside of the mould. Preferably the terminal part forms an outer wall the diameter of which is substantially equal to the inner diameter of the mould; then the projecting rim extends in continuation of the outer wall and the outer wall extends tangential to the curvature of the projecting rim of concave shape.

When the terminal part is formed in this way a seamless transition from the terminal part to the inner wall of the mould is effected by the projecting rim. This seamless transition is of particular advantage for the pressure sealed closure of the longitudinally adjustable mould. By the seamless transition between the terminal part and the inner wall of the mould furthermore causes a seamless transition between the bottom element and the other element of the container to be obtained when containers are blow moulded.

Advantageously, according to the invention, an adjusting device with at least one threaded spindle is provided in the blowing mould and engages the terminal part on the outside of the mould. When only one threaded spindle is used, preferably one end of this threaded spindle is fixed centrally on the outside of the terminal part and extends through a carrier of the mould. When a plurality of threaded spindles is used, preferably these spindles are arranged distributed symmetrically over the terminal part. Thereby tilting of the terminal part relative to the mould is avoided. Furthermore the adjusting device can have at least one adjustment nut which cooperates with the thread of the threaded spindle and which can be adjusted in a way known per se, e.g. manually or by motor, for adjustment of the terminal part and thus for adjusting the length of the mould.

Preferably the mould is fixedly anchored on the carrier whereby relative movements between the mould and the terminal parts are reliably avoided also in case of high interior pressures in the mould.

BRIEF DESCRIPTION OF THE DRAWINGS

An embodiment of the blowing mould according to the invention is illustrated schematically and partly in section in the FIGURE and will now be explained and described in detail with reference to the numerals.

PREFERRED EMBODIMENT OF THE INVENTION

In the Figure the blowing mould is illustrated in its entirety and partly in longitudinal section. The blowing mould illustrated and described hereinbelow is of the same kind as the device for blow moulding which is described in DE-PS 1479631 mentioned in the beginning. The embodiment of the blowing mould described hereinbelow however is not restricted to this construction but can be used accordingly also in other known constructions of blowing mould devices.

The blowing mould illustrated in the FIGURE first of all consists of a mould 1 of generally cylindric shape which is provided with cooling passages 2 in its walls. These cooling passages 2 are connected to coolant supply conduits in known and therefore not particularly described manner. On one side, in the illustrated example on the upper side, the mould 1 is provided with a frame construction 3 a cross head 4 of which can be recognized. This frame construction 3 carries the multipart upper portion of the mould 5 illustrated only schematically in side-elevation. The elements of the upper portion of the mould 5 can be shifted relative to each other for example by hydraulic devices so that the mould 1 is closed on its upper side and an aperture 6 is formed for the blow nozzle which is not illustrated here. This embodiment of the device for flow moulding is known from the printed publication mentioned in the beginning and therefore is not described in further detail here.

The mould 1 is arranged on a carrier 7 which, in the embodiment illustrated, forms a carrier plate 8 which is supported through running wheels 9 on rails 10. The carrier plate 8 is fixedly connected to the frame construction 3 by an anchorage; only two of several anchors 11 can be recognized in the Figure, by means of said anchors the cross head 4 or the frame construction 3, respectively, and thus the mould 1 being anchored to the carrier plate 8.

At the end remote from the frame construction 3, on the underside in the embodiment illustrated, the mould 1 is closed by an adjustable terminal part 20 which here forms a bottom element or a bottom plate of the mould 1. The terminal part 20 is provided with an projecting rim 21 on the inner side of the mould and this projecting rim 21 is of concave shape with a curvature 22. The terminal part 20 furthermore determines an outer wall 23 the diameter of which is substantially equal to the inside diameter of the mould 1. The projecting rim 21 extends in continuation of the outer wall 23 in such a way that the outer wall 23 extends substantially tangential to the curvature 22 of the projecting rim 21.

On the outside of the mould an adjusting device 24 engages the terminal part 20. In the embodiment illustrated this adjusting device consists of a threaded spindle 25 with a thread 26 and is arranged centrally on the terminal part 20. The threaded spindle 25 extends through an aperture, not illustrated, in the carrier plate 8. Below the carrier plate 8 an adjustment nut 27 is arranged which engages the thread 26 of the threaded spindle 25 and is illustrated only schematically. The adjustment nut 27 can be adjusted by conventional means which therefore are not particularly illustrated, such that the axial adjustment of the terminal part within the mould, indicated by the arrow 28, is effected thereby. But a plurality of threaded spindles can also be distributed symmetrically over the terminal part 20 whereby tilting of the terminal part 20 relative to the mould 1 during the adjustment is avoided.

The fixed anchorage of the mould 1 to the carrier plate 8 by the anchor 11 connected to the frame construction 3 ensures that no relative movements between the mould 1 and the terminal part 20 can happen also in case of high interior pressures in the closed blowing mould. The particular form of the projecting rim described heretofore supports the pressure sealed closing of the mould 1 by the terminal part 20. This form of the projecting rim 21 has the further advantage that a seamless transition exists between the terminal part 20 and the interior wall of mould 1 such that in practice the container is made without a seam between its bottom element and the other elements of the container.

The idea and purpose of the new development consists in providing a blowing mould which allows to make containers of most different volumes and also of volumes differing from the standard sizes by means of one single blowing mould, without having to use other blowing moulds or differently assembled blowing moulds for each volume, whereby not only considerable technical simplification is achieved but also quite considerable investments are saved.

I claim:

1. A blow mold for producing blow molded hollow containers, comprising
   a hollow mold portion having an inner surface of a generally cylindric shape and defining a cavity therein,
   a support structure, on which said hollow mold portion is supported,
   an end wall section which has a peripheral surface of substantially the same shape as said generally cylindric shape of said inner surface and which is axially movably guided in said hollow mold portion and which closes said cavity at one end thereof,
   said end wall section having an end face facing said cavity and forming a concave projecting rim adjacent said inner surface,
   said cavity having an end remote from said end wall section, closure and blow means for closing said cavity at the end remote from said end wall section and for inflating a plastic hollow body to engage the inner surface defining said cavity and, after hardening, forming a hollow container, and
   continuously variable adjusting means fixedly arranged between said support structure and said end wall section for axially adjusting said end wall section to different axial positions within said hollow mold portion without dismantling said hollow mold portion, said end wall section or said support structure.

2. A blow mold as claimed in claim 1, wherein said hollow mold portion is of a hollow cylindrical shape.

3. A blow mold as claimed in claim 1, wherein said continuously variable adjusting means comprise:
   threaded spindle means mounted in said end wall section and extending therefrom in an axial direction with respect to said hollow mold portion and on a side remote from said cavity, and
   nut means in engagement with said spindle means and arranged on said support structure to permit axial displacement of said spindle means and said end wall section upon adjustment of said nut means.

4. A blow mold as claimed in claim 3, wherein said spindle means comprise a single threaded spindle having an axis which is aligned with a central longitudinal axis of said hollow mold portion, and said nut means comprise a single nut cooperating with said threaded spindle.

5. A blow mold for producing blow molded hollow containers and comprising:
   a hollow circumferentially closed mold portion defining a central longitudinal axis;
   said hollow circumferentially closed mold portion having a wall which bounds a cavity extending lengthwise through said hollow circumferentially closed mold portion and having a first end and a second end;
   a support structure supporting said hollow circumferentially closed mold portion;
   an end wall section received in said hollow circumferentially closed mold portion and defining said first end of said cavity;
   a combined closure and blow means operatively connected with said hollow circumferentially closed mold portion and defining said second end of said cavity;
   said combined closure and blow means, after closing said hollow circumferentially closed mold portion, permitting insertion of plastified hollow body into said cavity and inflation of said plastified hollow body in order to thereby produce, as a result of blow molding operation and after hardening, a blow molded hollow container;
   said end wall section, on a side facing said cavity, possessing a concave projecting rim peripherally engaging said wall of said hollow circumferentially closed mold portion;
   said projecting rim of said end wall member guidingly engaging said wall of said hollow circumferentially closed mold portion for movement along said central longitudinal axis of said circumferentially closed hollow mold portion;
   continuously variable adjusting means drivingly connected to said end wall section on a side remote from said cavity for continuously variably adjusting said end wall section within said hollow circumferentially closed mold portion along said central longitudinal axis of said hollow circumferentially closed mold portion; and
   said end wall section, under the action of said continuously variable adjusting means, being continuously variably adjustable in its entirety and in the assembled state with at least the hollow circumferentially closed mold portion in order to thereby define cavities of various predetermined lengths for blow molding blow molded containers of various predetermined unit lengths.

* * * * *